Aug. 20, 1968  V. E. SPROUSE ET AL  3,397,864
MULTI-STAGE ROTARY ENGINE
Filed Feb. 27, 1967  2 Sheets-Sheet 1
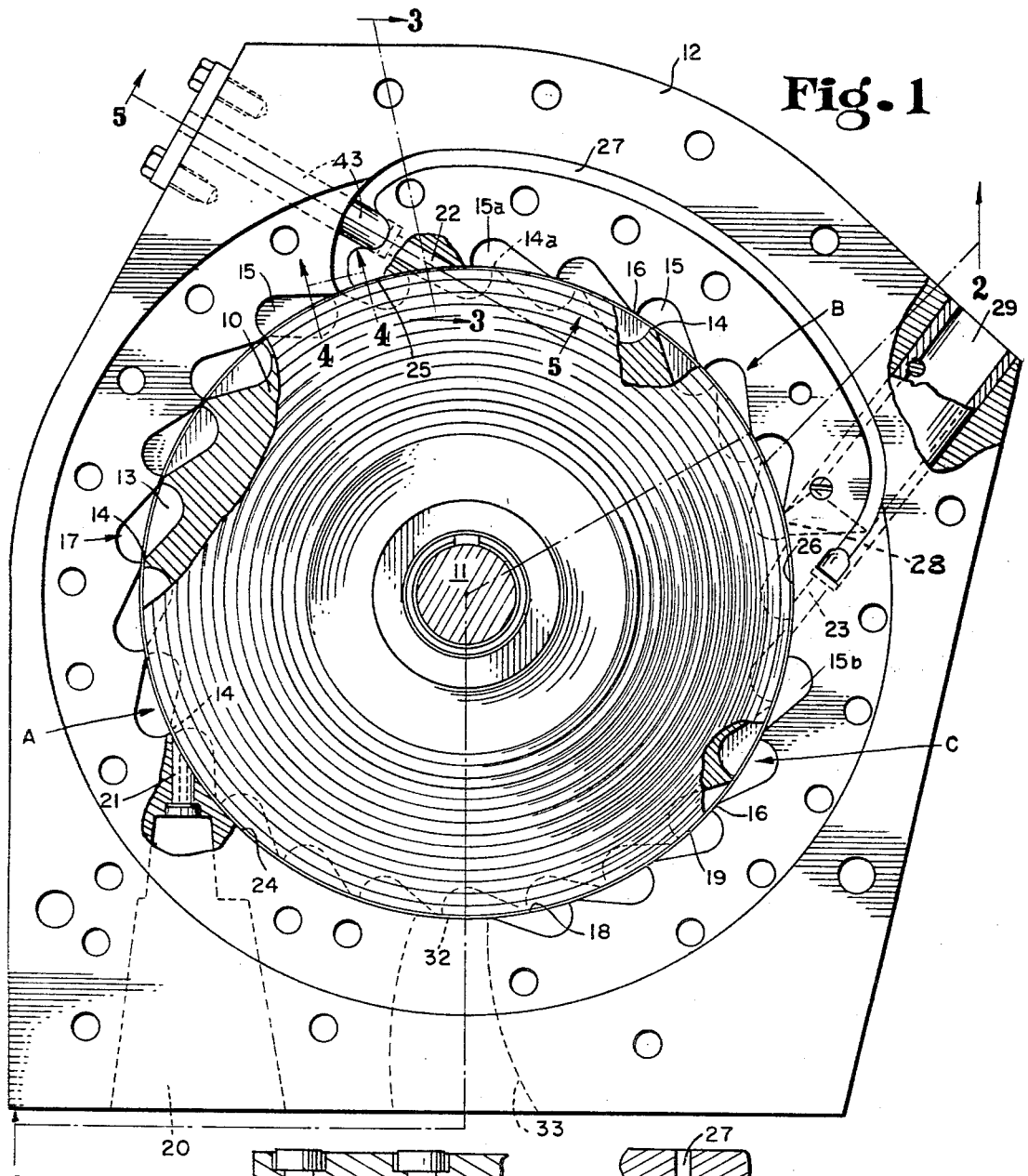
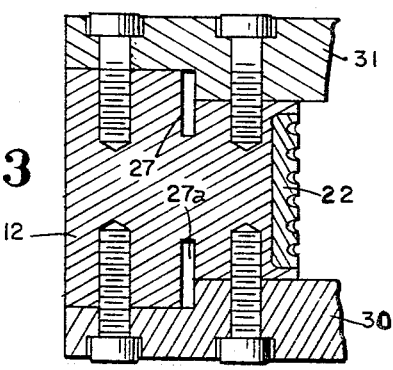
INVENTORS
VERNER E. SPROUSE
VERNON H. WILLIAMS
BY
Hubert A. Winterw
ATTORNEY

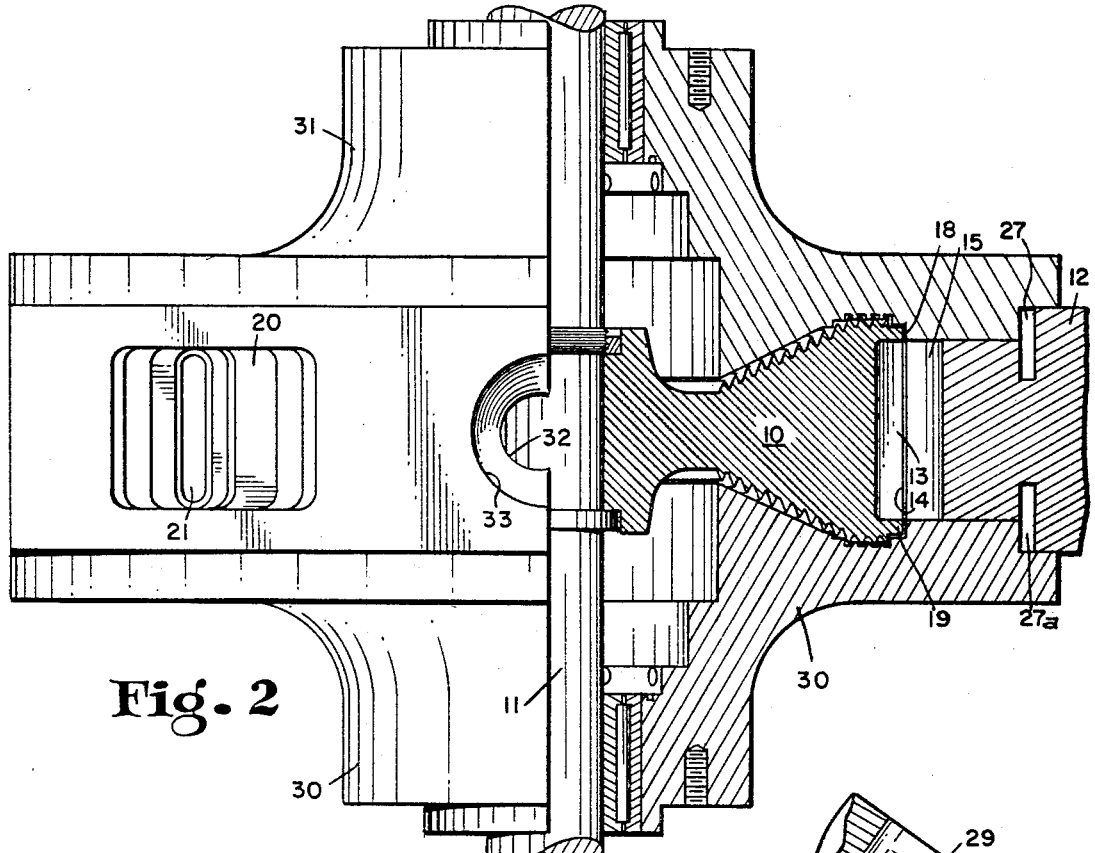
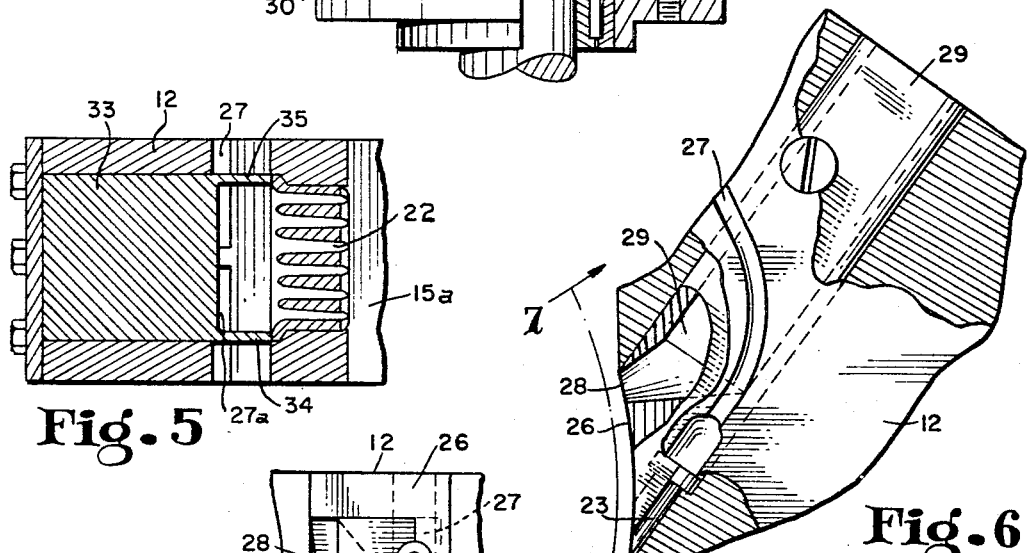
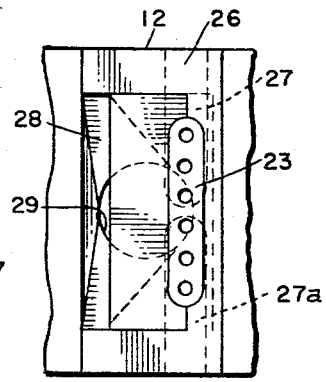
INVENTORS
VERNER E. SPROUSE
VERNON H. WILLIAMS
ATTORNEY

3,397,864
MULTI-STAGE ROTARY ENGINE
Verner E. Sprouse and Vernon H. Williams, both of
1804 E. 22nd St., Columbus, Ind. 47201
Filed Feb. 27, 1967, Ser. No. 618,966
7 Claims. (Cl. 253—46)

ABSTRACT OF THE DISCLOSURE

A rotary engine having a rotor with a plurality of cells therearound within a stator having like cells in a plurality of separated stages circumferentially spaced to vary openings of rotor cells into stator cells in each rotor rotation. Steam from one stage is divided to flow in part to a following stage and in part to by-pass that stage to enter a stage therebeyond.

---

This invention relates to a rotary engine and provides therein an improved structure wherein the power output is surprisingly great through use of multiple stages with pressure fluid proportionately entered and by-passed through selected stages.

The invention is described in one particular form in reference to the accompanying drawings in which:

FIG. 1 is a view in side elevation and partial section of an engine embodying the invention, with a side plate removed to disclose the relationship between the rotor, the stator, and steam flows;

FIG. 2 is a view in half section on the line 2—2 in FIG. 1;

FIG. 3 is a detail in section on the line 3—3 in FIG. 1;

FIG. 4 is a detail in section across steam by-pass conduits in FIG. 1;

FIG. 5 is a view in section on the line 5—5 in FIG. 1 through a nozzle anchoring and steam flow proportioning means between stages;

FIG. 6 is a detail in partial section of a steam by-pass conduit discharge nozzle and an exhaust channel; and FIG. 7 is a view in detail in stator inside elevation on the line 7—7 in FIG. 6 of that part of the structure shown in FIG. 6.

Referring first to FIG. 1, a rotor 10 is fixedly mounted on a shaft 11 to rotate with a close running fit of its periphery within a stator 12. The rotor 10 is provided with a plurality of cells 13 entering from the rotor periphery and terminating therein by short circumferential lands 14. All of these cells 13 are of the same uniform shape and circumferential length.

The stator is provided with three circumferentially spaced apart stages A, B, and C, in each of which stages there are a plurality of cells 15 reversed in shape but each of the same circumferential length as that of each of the cells 13 with a peripheral land 16 therebetween of the same length as that of each of the rotor lands 14.

These cells 13 and 15, when matching land 14 with land 16, form an overall approximately elliptical cell 17 with parallel sides and arcuate ends, the overall cell 17 extending diagonally across the circumferential outer boundary lines of the rotor side flanges 18, 19 from arcuate cell ends in the stator to arcuate cell ends in the rotor, as indicated in FIG. 1. In operation, the rotor cell ends advance from the stator cell ends.

The stator 12 is provided with an entry steam chamber 20 terminating inwardly by a series of side-by-side nozzles 21 having the same arrangement as the nozzles 22 in FIG. 5 and 23 in FIG. 6. These nozzles 21, as indicated in FIG. 1, are directed toward the receding rotor cells 13.

As an example only (there may be more or less stator cells), six stator cells 15 are shown between the nozzle 21 end of a stator land 24 and a stator land 25. Between these two stator lands, the cell lands 14 and 16 will match with the rotor 10 positioned as indicated in FIG. 1. In this rotor position, the land 25 is given a length which will space the first stator cell 15a clockwise to have the rotor number eight cell land 14a one-third of the length of the stator cell 15a from the land 25. Consequently, all of the rotor cells 13 in Stage B will be accordingly presented in relation to the stator cells 15 herein, as an example only, being five in number between the land 25 and a next land 26.

The next land 26 is devoid of cells and has a circumferential length to space following stator cells 15b into location to have their lands 16 spaced relative to rotor lands 14, each a distance of two-thirds the length between adjacent rotor ahead of lands 14. There are shown five of these stator cells 15b between the land 26 and the next circumferentially spaced land 24. As shown in FIG. 1, a rotor land 14 is immediately ahead of the nozzle 21 to permit the nozzle directed steam to enter the rotor cell 13 then across the nozzles 21.

Steam will flow and expand from the nozzles 21 between the rotor cells 13 and the stator cells 15 through the Stage A to the land 25. There the flow will be confined to the rotor cells. Initially, this flow escapes through a conduit 27 which leaves the land 25 by-passing Stage B around to discharge through the nozzles 23 through the land 26 into the stator stage C. However, part of this stream flow from Stage A is proportionately divided to leave the conduit 27 adjacent to the land 25 and to flow through the nozzles 22 through the land 25 into stator Stage B to traverse the cells 13 and 15a.

From the stator Stage B, steam escapes through an approximately rectangular orifice 28 at the beginning of the land 26 opening through the stator to discharge externally through the pipe 29. The conduit 27 may extend selectively through either the outside of the stator, or as herein shown therein. The conduit 27, in order to have sufficient capacity when within the stator 12 is herein shown as being imbedded, one branch 27 on one side and a second branch 27a on the other side of the stator 12 and covered over respectively by the stator side plates 30 and 31, the two branches joining each other at their respective ends, as in FIGS. 5 and 7.

The land 24 carries an exhaust orifice 32 opening into an exhaust passage 33 extending through the stator 12. The land 24 is devoid of cells. The nozzles 22 are diagonally inserted through the land 25 to be directed toward the arcuate ends of the rotor cells 13. In the form herein shown, FIGS. 1 and 5, the nozzles 22 are in a bank extending laterally across the width of the rotor cells and are held in place by a key 43 which straddles the bank by keys 34 and 35 pressed against ends thereof.

The side plates 30 and 3 which are detachably attached to the sides of the stator 12, carry the rotor shaft 11. Steam sealing means of course are employed between the rotor sides and the stator and along the shaft 11. Since the showing in detail of such sealing means would tend to obscure the inventive features and do not enter per se into the invention, such means are omitted.

The driving power is above referred to as steam, but without limitation thereto since other gases may be employed under pressure to drive the rotor. Further, it is to be emphasized that while the structure described herein is the one at present best known to us, it is obvious that other structural shapes of elements may be employed without departing from the spirit of the invention unless limited by the scope of the appended claims.

We claim:

1. In an engine, the combination with a rotor and a stator wherein the rotor has a plurality of cells therearound open through the rotor periphery, of a plurality of stages of the stator through which rotor cells pass;

a nozzle directing fluid across said cells in one stage toward a following stage;

means at an end of said one stage directing part of said fluid into said following stage and by-passing the remainder of the fluid around that following stage;

means exhausting said fluid from said following stage;

means directing said by-passed fluid into a subsequent one of said stages across cells traversing the subsequent stage;

means exhausting fluid from said subsequent stage; and a stator land between said last exhausting means and said nozzle over which stator land said rotor cells travel approximately empty of fluid.

2. The structure of claim 1, in which there are stator cells around the stator and open toward the openings of the cells in said rotor from each of said stages; and both said rotor and said stator cells having transverse end lines equally spaced apart and forming momentarily closed ended combined cells opening and closing as said rotor lines traverse said stator lines.

3. The structure of claim 2, in which there is a circumferential land between said one stage and said following stage;

another land beween said following stage and said subsequent stage;

said lands spacing apart said stator cells; and said spacing being that wherein the rotor cells, upon entering said following stage, will have their transverse end lines spaced a circumferential length of the cells from the initial stator cell transverse line appearing in that following stage.

4. The structure of claim 3, in which said rotor cell transverse lines are spaced ahead of the stator transverse lines in said subsequent stage a distance exceeding that in said following stage.

5. The structure of claim 4, in which said rotor cell spacing is one-third of said cell length in said following stage; and said rotor cell spacing is two-thirds of said cell length in said subsequent stage.

6. The structure of claim 1, in which said means directing fluid in said following stage comprises a nozzle directed to discharge into a combined opening into initial cells at the end of said one stage, the direction of the nozzle being toward the remote end of said rotor cells; and said means directing said by-passed fluid comprising a nozzle directed toward the initial rotor cells entering said subsequent land.

7. The structure of claim 6, in which each of all of said nozzles comprises a bank of individual nozzles of discharge openings relatively small in comparison to the width of said cells.

References Cited

UNITED STATES PATENTS

| | | | |
|---|---|---|---|
| 801,678 | 10/1905 | Neumayer | 253—53 X |
| 805,523 | 11/1905 | Bryant et al. | 253—48 |
| 828,178 | 7/1909 | Burnfield | 253—46 |
| 970,106 | 9/1910 | Peters | 253—53 X |
| 1,505,187 | 8/1924 | Belknap | 253—48 |

EVERETTE A. POWELL, JR., *Primary Examiner.*